UNITED STATES PATENT OFFICE.

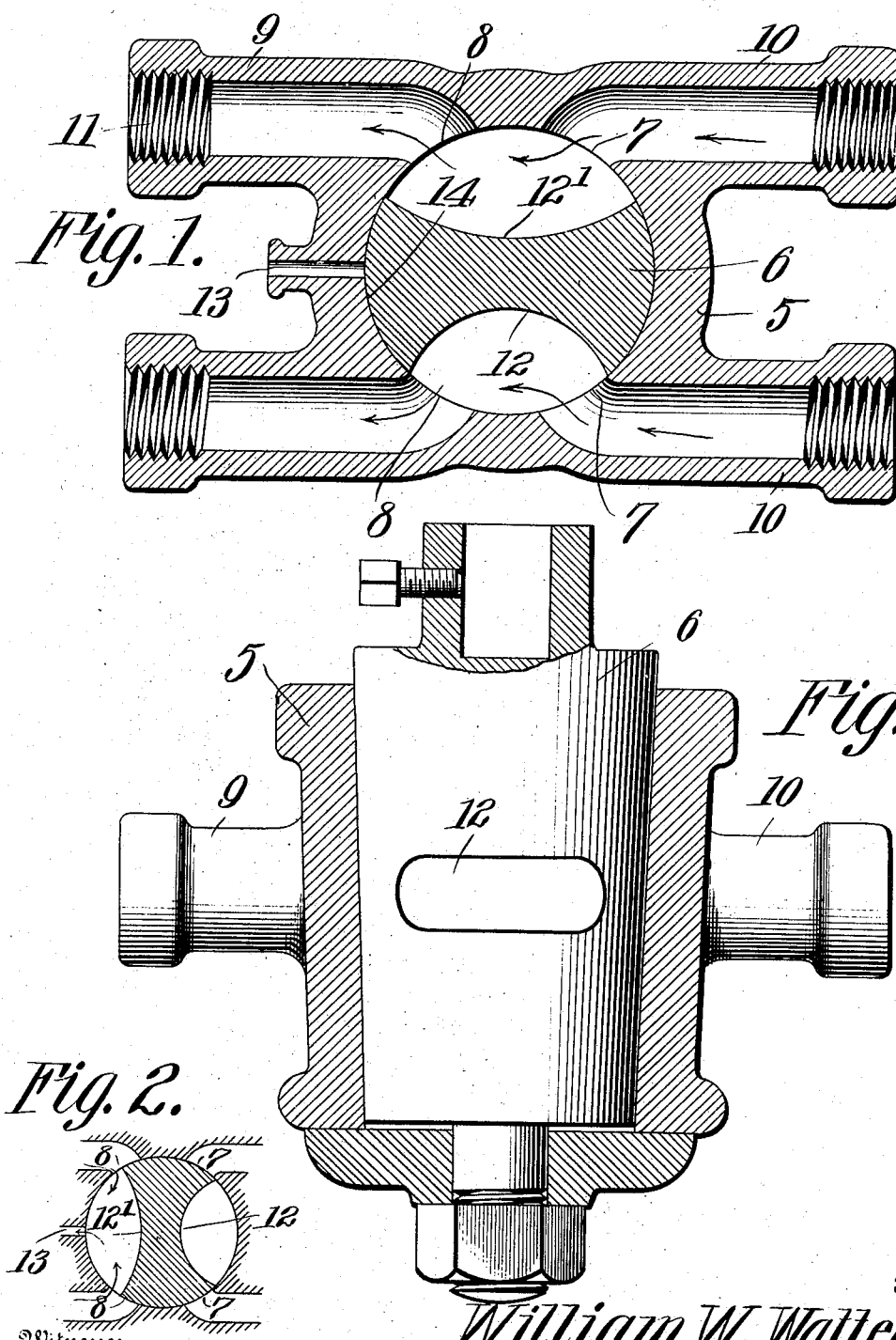

WILLIAM W. WATTERS, OF ATLANTA, GEORGIA.

STOP AND WASTE COCK.

No. 911,858.        Specification of Letters Patent.        Patented Feb. 9, 1909.

Application filed May 28, 1908. Serial No. 435,513.

*To all whom it may concern:*

Be it known that I, WILLIAM W. WATTERS, a citizen of the United States, residing at Atlanta, in the county of Fulton and State of Georgia, have invented a new and useful Stop and Waste Cock, of which the following is a specification.

This invention relates to valves and more particularly to a combined stop and waste cock.

The object of the invention is to provide a valve for cutting off the flow of hot and cold water in the service pipes and at the same time draining said pipes.

A further object is to provide a valve including a casing having duplicate inlet and discharge ports to permit the passage of both hot and cold water, the valve being so arranged as to open and close each set of ports when in one position and close said ports and permit drainage when the valve is in another position.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

In the accompanying drawings forming a part of this specification: Figure 1 is a transverse sectional view of a combined stop and waste cock constructed in accordance with my invention showing the ports in open position to permit the passage of both hot and cold water. Fig. 2 is a similar view on a small scale showing the valve in closed position. Fig. 3 is a vertical sectional view of the same.

Similar numerals of reference indicate corresponding parts in all of the figures of the drawings.

The improved valve forming the subject matter of the present invention includes a casing 5 having its interior walls inclined to form a chamber for a correspondingly inclined turning plug or valve 6.

The walls of the casing 5 are formed with a plurality of sets of inlet and discharge ports 7 and 8, one set of ports being arranged on each side of the valve casing so as to permit the flow of both hot and cold water through said casing at the same time.

The walls of the ports 7 and 8 are extended laterally to form nipples 9 and 10, the interior walls of which are threaded at 11 for connection with the hot and cold water service pipes, respectively, there being oppositely disposed ports 12 and 12' formed in the tapered walls of the plug or valve 6 and adapted to register with the adjacent ports 6 and 7 to permit the passage of fluid through the valve casing, as before stated.

Arranged between the nipples 9 on one side of the valve casing is a vent opening or drain 13, which latter is closed by the portion 14 of the valve or plug when said valve is in the position shown in Fig. 1 of the drawings thereby to prevent the escape of fluid through the vent opening when the valve is open.

The ports 12 and 12' are so arranged with respect to the ports 7 and 8 that when the plug or valve 6 is given a quarter turn the portions 14 will close the inlet ports at the nipples 10, while the port 12' will partially close the ports 8 thus permitting the water in the service pipes connected with the nipples 9 to enter the valve chamber and drain through the waste pipe 13. It will thus be seen that when the valve is in open position both hot and cold water may flow through the valve casing at the same time thus obviating the necessity of employing separate valves for controlling the fluid in the hot and cold water pipes. It will also be noted that when the valve is in closed position the inlet port 7 of both the hot and cold water pipes will be cut off while the discharge ports 8 of the hot and cold water pipes will be placed in communication with each other and also with the vent 13 so as to permit drainage of the same.

The improved valve may be used in connection with water distributing systems, boiler furnaces, hot water heating systems, or wherever a valve of this character is found desirable or necessary.

Having thus described the invention what is claimed is:

1. A valve including a casing having a plurality of sets of inlet and discharge ports to permit the passage of hot and cold water through the casing, and a valve disposed within the casing and arranged to open both sets of ports when the valve is in one position and close one port of each set when the valve is in the other position, there being a vent disposed between one of the ports of each set to permit drainage when the valve is in closed position.

2. A valve including a casing having a plurality of sets of inlet and discharge ports for connection with hot and cold water pipes, respectively, there being a vent formed in the valve casing between the discharge ports of adjacent sets, and a valve arranged to open one set of ports when the valve is in one position and close some of the ports and permit drainage through the vent when the valve is in another position.

3. A valve including a casing having a plurality of sets of inlet and discharge ports, there being a vent opening formed in the casing and disposed between the discharge ports of adjacent sets, and a valve arranged within the casing and having its side walls cut away to form ports of different sizes, said valve being arranged to open both sets of ports when the valve is in one position and close one port of each set and permit drainage through the vent when the valve is in another position.

4. A valve including a casing having a plurality of inlet and discharge ports to permit the passage of hot and cold water through the casing, there being a vent formed in the valve casing, a valve arranged within the casing and having its side walls cut away to form oppositely disposed ports of different sizes, one of the ports in the valve being adapted to partly register with the discharge ports in the casing to permit drainage through the vent when the valve is in closed position.

5. A valve including a casing having a plurality of sets of inlet and discharge ports, the walls of the ports being extended to form nipples having interior threads for connection with hot and cold water pipes, respectively, there being a vent formed in the valve casing between the discharge ports, and a valve arranged within the casing and adapted to close the inlet ports of both sets and form a source of communication between the discharge ports thereby to permit drainage through the vent when the valve is in closed position.

In testimony that I claim the foregoing as my own, I have hereto affixed my signature in the presence of two witnesses.

WILLIAM W. WATTERS.

Witnesses:
  W. S. PARKER,
  SCOTT CROWDER.